US009646001B2

(12) United States Patent
Sarikaya et al.

(10) Patent No.: US 9,646,001 B2
(45) Date of Patent: May 9, 2017

(54) MACHINE TRANSLATION (MT) BASED SPOKEN DIALOG SYSTEMS CUSTOMER/MACHINE DIALOG

(75) Inventors: Ruhi Sarikaya, Shrub Oak, NY (US); Vaibhava Goel, Chappaqua, NY (US); David Nahamoo, White Plains, NY (US); Rèal Tremblay, Outremont (CA); Bhuvana Ramabhadran, Mount Kisco, NY (US); Osamuyimen Stewart, Piscataway, NJ (US)

(73) Assignee: Nuance Communications, Inc., Burlington, MA (US)

( * ) Notice: Subject to any disclaimer, the term of this patent is extended or adjusted under 35 U.S.C. 154(b) by 235 days.

(21) Appl. No.: 13/236,016

(22) Filed: Sep. 19, 2011

(65) Prior Publication Data
US 2013/0073276 A1    Mar. 21, 2013

(51) Int. Cl.
*G06F 17/28* (2006.01)
*G10L 15/26* (2006.01)
*G10L 15/22* (2006.01)
*H04M 3/42* (2006.01)

(52) U.S. Cl.
CPC .......... *G06F 17/289* (2013.01); *G10L 15/22* (2013.01); *H04M 3/42* (2013.01); *G10L 15/26* (2013.01); *H04M 3/42391* (2013.01); *H04M 2242/12* (2013.01)

(58) Field of Classification Search
CPC ....... G06F 17/28; G10L 15/265; G10L 15/22; H04M 3/5232
USPC ............ 704/1–10, 244, 235, 265; 379/265, 379/88.01, 266.02; 381/70; 455/3.05
See application file for complete search history.

(56) References Cited

U.S. PATENT DOCUMENTS

| | | | | | |
|---|---|---|---|---|---|
| 5,497,319 A | * | 3/1996 | Chong | ............... | G06F 17/2264 704/10 |
| 5,963,632 A | * | 10/1999 | Miloslavsky | ........... | H04M 3/51 379/219 |
| 5,987,401 A | * | 11/1999 | Trudeau | .............. | H04L 12/1827 704/2 |

(Continued)

OTHER PUBLICATIONS

Cekel Yvonne, "Real-Time Multilingual Chat for the Call Center: Engaging the Global Marke", Jun. 2011, Connections Magazine.*

(Continued)

*Primary Examiner* — Pierre-Louis Desir
*Assistant Examiner* — Seong Ah A Shin
(74) *Attorney, Agent, or Firm* — Hamilton, Brook, Smith & Reynolds, P.C.

(57) ABSTRACT

Operation of an automated dialog system is described using a source language to conduct a real time human machine dialog process with a human user using a target language. A user query in the target language is received and automatically machine translated into the source language. An automated reply of the dialog process is then delivered to the user in the target language. If the dialog process reaches an initial assistance state, a first human agent using the source language is provided to interact in real time with the user in the target language by machine translation to continue the dialog process. Then if the dialog process reaches a further assistance state, a second human agent using the target language is provided to interact in real time with the user in the target language to continue the dialog process.

21 Claims, 2 Drawing Sheets

(56) References Cited

U.S. PATENT DOCUMENTS

| | | | |
|---|---|---|---|
| 6,847,714 B2* | 1/2005 | Das | H04M 3/5233 379/221.01 |
| 6,895,083 B1* | 5/2005 | Bers | H04M 3/5232 379/266.02 |
| 6,904,143 B1 | 6/2005 | Peterson et al. | |
| 7,031,906 B2* | 4/2006 | Shimohata | G06F 17/289 704/2 |
| 7,295,963 B2* | 11/2007 | Richardson | G06F 17/2836 704/2 |
| 7,711,105 B2* | 5/2010 | Basson | H04M 3/5233 379/265.01 |
| 7,774,230 B2* | 8/2010 | Libman | G06Q 10/10 705/14.1 |
| 8,145,172 B2* | 3/2012 | Khoini-Poorfard | H03J 1/0008 455/266 |
| 8,145,472 B2* | 3/2012 | Shore | G06F 17/2836 704/2 |
| 8,374,881 B2* | 2/2013 | Bangalore | G06F 17/279 704/2 |
| 8,407,049 B2* | 3/2013 | Cromack | G06F 17/30743 704/235 |
| 8,442,830 B2* | 5/2013 | Nakajima | G10L 15/183 704/257 |
| 8,468,149 B1* | 6/2013 | Lung | G06F 17/30017 707/713 |
| 8,510,399 B1* | 8/2013 | Byttow | G06Q 10/10 707/770 |
| 8,782,069 B2* | 7/2014 | Jockish | G06F 17/30675 707/705 |
| 9,047,274 B2* | 6/2015 | Venkatapathy | G06F 17/2836 |
| 2005/0049851 A1* | 3/2005 | Watanabe | G06F 17/2827 704/2 |
| 2006/0018443 A1* | 1/2006 | Knott | H04M 3/493 379/88.16 |
| 2006/0067508 A1 | 3/2006 | Basson et al. | |
| 2006/0109974 A1* | 5/2006 | Paden | H04M 3/51 379/265.02 |
| 2007/0121902 A1* | 5/2007 | Stoica | G06Q 10/10 379/265.11 |
| 2007/0201677 A1* | 8/2007 | Bates | H04M 3/4935 379/265.01 |
| 2007/0294076 A1* | 12/2007 | Shore | G06F 17/2836 704/2 |
| 2008/0021762 A1* | 1/2008 | Coon | G06Q 10/06 705/7.32 |
| 2008/0205629 A1 | 8/2008 | Basson et al. | |
| 2011/0116492 A1 | 5/2011 | Byron et al. | |
| 2012/0166183 A1* | 6/2012 | Suendermann | G06F 17/30654 704/9 |
| 2013/0077775 A1* | 3/2013 | Fan | H04M 3/5166 379/265.09 |
| 2014/0270144 A1* | 9/2014 | Bentley | H04M 3/5116 379/265.12 |

OTHER PUBLICATIONS

Espana-Bonet et al., "Full machine translation for factoid question answering" Proceedings of the Joint Workshop on Exploiting Synergies between Information Retrieval and Machine Translation (ESIRMT) and Hybrid Approaches to Machine Translation (HyTra). Association for Computational Linguistics, 2012.*

Cekel Yvonne, "Real-Time Multilingual Chat for the Call Center: Engaging the Global Market", Jun. 2011, Connections Magazine.*

Cristina et al., "Full machine translation for factoid question answering." Proceedings of the Joint Workshop on Exploiting Synergies between Information Retrieval and Machine Translation (ESIRMT) and Hybrid Approaches to Machine Translation (HyTra). Association for Computational Linguistics, 2012.*

Cekel, Yvonne, "Real-Time Multilingual Chat for the Call Center: Engaging the Global Market", *Connections Magazine*, 2 pages, (Jun. 2011).

* cited by examiner

MACHINE TRANSLATION (MT) BASED SPOKEN DIALOG SYSTEMS CUSTOMER/MACHINE DIALOG

TECHNICAL FIELD

The present invention relates to multi-language human-machine dialog systems.

BACKGROUND ART

It is extremely costly and time consuming to build spoken dialog systems for the same task in multiple different languages due to the required target language expertise and the data needed to build such applications. In addition, user contact centers for large corporations are often distributed across several different geographic locations to handle users that speak different languages, and any one contact center in any single country typically is not able to handle many different languages. It is, however, very costly to have all these contact centers that provide essentially the same service in different languages and in different countries.

Current state-of-the-art spoken dialog systems operate along the following path. A user calling a help desk in the United States typically will first enter a spoken dialog system (human-machine dialog) in English. In some cases there may be support for Spanish but you can't talk to the machine in Chinese, Turkish, etc. . . . in the U.S.) To talk to a human agent (human-human dialog) in the middle of the human-machine dialog, then the user will talk to an English speaking agent. If a user calls the same company's helpdesk in France, they will reach a spoken dialog system built in French, and if they decide to talk to a human agent at any point in the dialog, they will speak to an agent who speaks French.

This process means that there is a separate dialog system developed for each language for the same task and there also is a separate user contact center for each language/country. There is a huge cost associated with building the same spoken dialog system (human-machine dialog) for each language and keeping separate contact centers for each country/language.

SUMMARY

Embodiments of the present invention are directed to operation of an automated dialog system using a source language to conduct a real time human machine dialog process with a human user using a target language. A user query in the target language is received and automatically machine translated into the source language. An automated reply of the dialog process is then delivered to the user in the target language. If the dialog process reaches an initial assistance state, a first human agent using the source language is provided to interact in real time with the user in the target language by machine translation to continue the dialog process. Then if the dialog process reaches a further assistance state, a second human agent using the target language is provided to interact in real time with the user in the target language to continue the dialog process.

The dialog process may be a text dialog process or a speech dialog process or a combination of both. Delivering an automated reply may include delivering an existing dialog process reply in the target language. Delivering an automated reply also may include selecting an existing dialog process reply in the source language, performing automatic machine translation of the selected reply to the target language, and delivering the translated reply to the user.

Embodiments also include an automated dialog system using a method according to any of the above, a customer service contact center operating an automated dialog system according to any of the above, and a computer program product implemented in a computer readable storage medium for operating an automated dialog system and including program code for performing a method according to any of the above.

DETAILED DESCRIPTION

Figure 1:
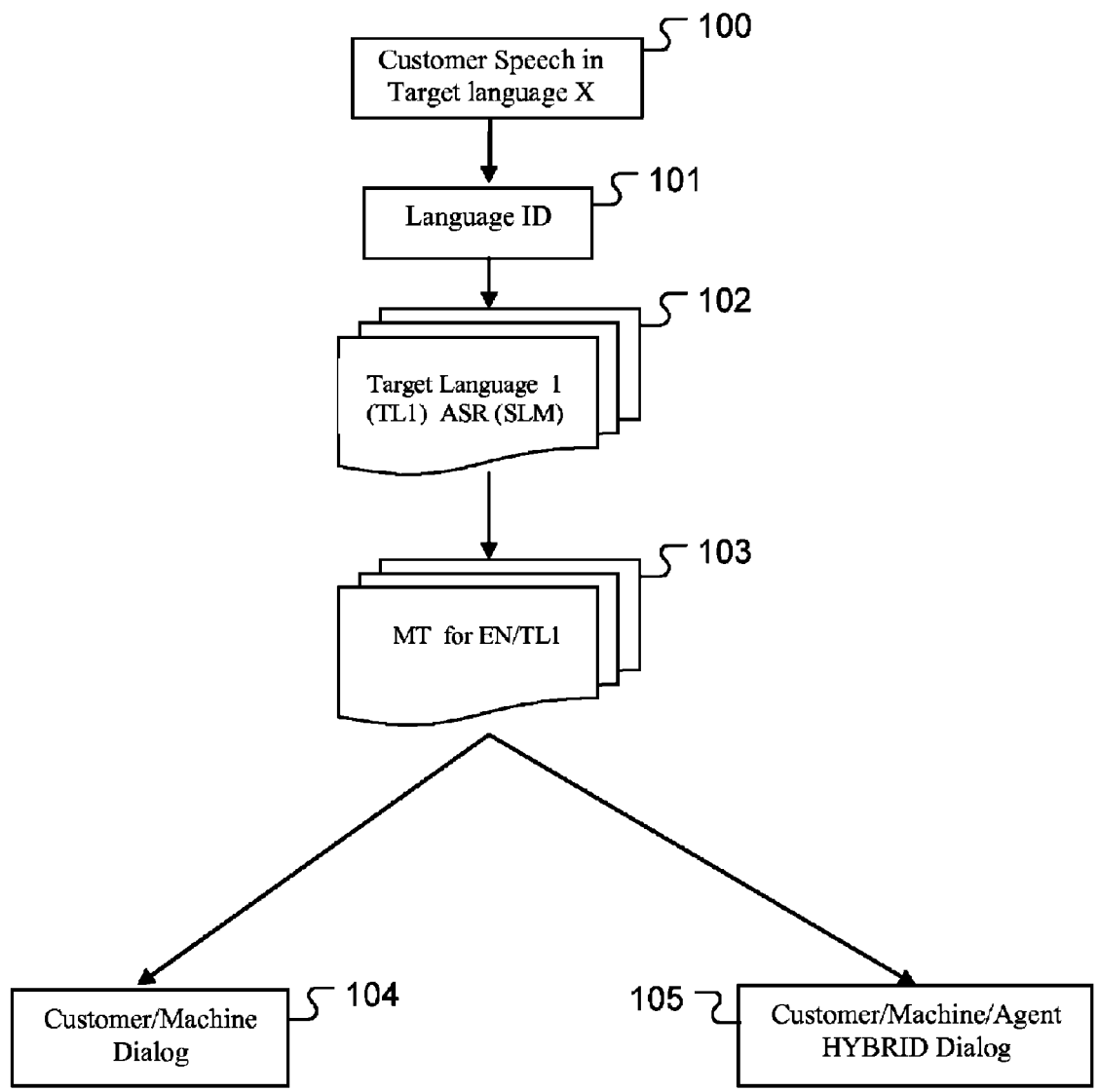
FIG. 1 shows functional blocks for using machine translation as a front end interface for spoken dialog systems.

Various embodiments of the present invention are directed to operation of a user dialog system (i.e. customer/machine, user/machine/non-native agent, user/machine/non-native agent/native agent) using automatic machine translation as an interface in the user/machine dialog. This allows one contact center in any one country to serve users from all over the world employing a single automated dialog system before sending the user call to a human agent (native or non-native). This approach is far more cost effective than the existing solutions since it eliminates the need to build the language understanding and dialog management in the target language, and instead both of these components are built only once for the source language (e.g., English). Although the following description is presented in terms of a spoken dialog system, the invention is not limited to that specific form and also would be useful in a text dialog system such as an online user service web site.

Such a dialog system is built first in a source language such as English, but is able to accept a user who speaks in a different language, for example Spanish. In one specific approach, the various target language dialog system components (e.g., Automatic Speech Recognition (ASR)/Statistical Language Model (SLM), Action Class (AC)/Understanding, Text-To-Speech (TTS)) may be developed given the corresponding elements in the source language dialog system. This can be done by translating the data using MT to the target language and building the models in the target language. Alternatively, an arrangement may be based on building only ASR and TTS in the target language and using an MT interface to perform the understanding and dialog management in the source language.

Using such arrangements, it is not necessary to build the same application in many other different languages, but instead the machine translation interface is used for routing all the customer service calls to the source language spoken dialog system. So when a customer calls in France, their speech inputs are recognized using a French ASR engine, the French text output is machine translated into English, and the English language spoken dialog system is used for the human-machine interaction. The machine dialog responses are generated/synthesized in French and the whole interaction will take place in French (at least from the customer point of view). At any point in this human-machine dialog if the customer wants to talk to a live agent, they are first forwarded to an English (source language) speaking agent in the single global contact center (assuming that speaking to an English agent is cheaper than speaking to a French agent). At this level of the dialog, the agent and the user do not speak the same language, but they communicate via machine translation of the dialog process. Each party speaks in their own language and their utterances are translated to the other language. In some applications, the customer may be told they will be talking to an agent who not speak the same language, but it may be beneficial for the customer to know that they are not talking to a machine but a human. If this human-human dialog via machine translation mediation is unsuccessful, then the customer is allowed to speak to a French speaking agent.

In building a specific embodiment, the choice of the source language may be determined based on minimizing cost and the available resources. For example, English may be a typical choice of a source language because there is a large existing body of available speech and language processing tools. Another possible source language could also be Chinese because the labor employed in the single global contact center will have the lowest cost.

FIG. 1 shows various functional blocks for using machine translation as a front end interface for a spoken dialog system implemented in a source language that conducts a real time <user/machine dialog> process with a human user using a target language. A user query in the target language initially is received, step 100, and the language of the query is identified, step 101. The input speech query then can be recognized using automatic speech recognition (ASR) in the target language, step 102. The target language ASR can be built in several ways including collecting corpora (audio+text) in the target language and building acoustic and language models, or translating the text material to the target language and augmenting this data with externally retrieved data (from web or other sources) and then building a mixture of language models, or a combination of both of these methods.

Automatic machine translation is used to map the query text from the user's native target language to the system's source language in which the entire dialog system is built, step 103. To support such automatic machine translation for multiple target languages, it may be useful to build and use large parallel corpora to create generic translation tables. Task specific parallel data can be collected and task specific translation tables can be built and combined. This would allow data sharing when building MT models across many applications for anchor language and other target language pairs.

The real time <user/machine dialog> process then delivers one or more automated replies to the user in the target language, again via machine translation, step 104. If the dialog process reaches an initial assistance state, the <user/machine dialog> backs off to a hybrid <user/machine/normative-agent dialog>. In other words, a human agent using the source language is provided to interact in real time with the user in the target language by machine translation to continue the dialog process, step 105. The non-native agent can have a list of questions and answers (e.g. FAQ) to ask and/or answer to the user. The agent can simply selects the question (or answer) (text) depending on the user's response. What the non-native agent selects can be either played out from the pre-recorded audio in the target language, or it can be synthesized in the target language. Or the non-native agent can speak in the source language and a speech-to-speech translation system can translate the speech in both source and target language to enable communications. The user response is always translated to the source language for the non-native agent.

If the hybrid non-native agent dialog, step 105, then reaches a further assistance state, the process backs off to a <user/native-agent dialog> where a second human agent using the target language is provided to interact in real time with the user in the target language to continue the dialog process. The native agent may act only as a translator—and he/she may have only a minimal knowledge of the actual application. The native speaker can also be bilingual, speaking both the user's target language and the non-native agent's source language.

The technical problem becomes that of machine translation with the advantage that in the initial assistance state the previous (failed) <user/machine dialog> interaction is made available to the normative agent via MT when needed to help get an idea what the problem is and how to rapidly solve it. And similarly if the dialog reaches the further assistance state, then the previous <user/machine dialog> interaction and <user/normative-agent dialog> history are available to the native agent.

Multi-modal forms of communications (e.g., text and audio for the dialog systems) may be used between the user and the agent(s) where both <user/machine dialog> and <user/agent dialog> take place in different stages of a given dialog process. For example, if the <user/machine dialog> takes the dialog to the initial assistance state where non-native agent assistance is required, then the non-native agent joins the dialog, solves the specific problem, and hands the dialog back to the machine. The dialog can also be four-way between the user, machine, normative agent and native agent. The machine's response can be directly formulated in the target language in the form of pre-recorded audio or synthesizing generated text response in the target language (without MT), or the response (text) can be generated in the source language and gets translated to the target language via MT. Likewise, the normative agent's response can be in several ways as described above (which essentially defines a multi-modal form of interaction).

Figure 2:
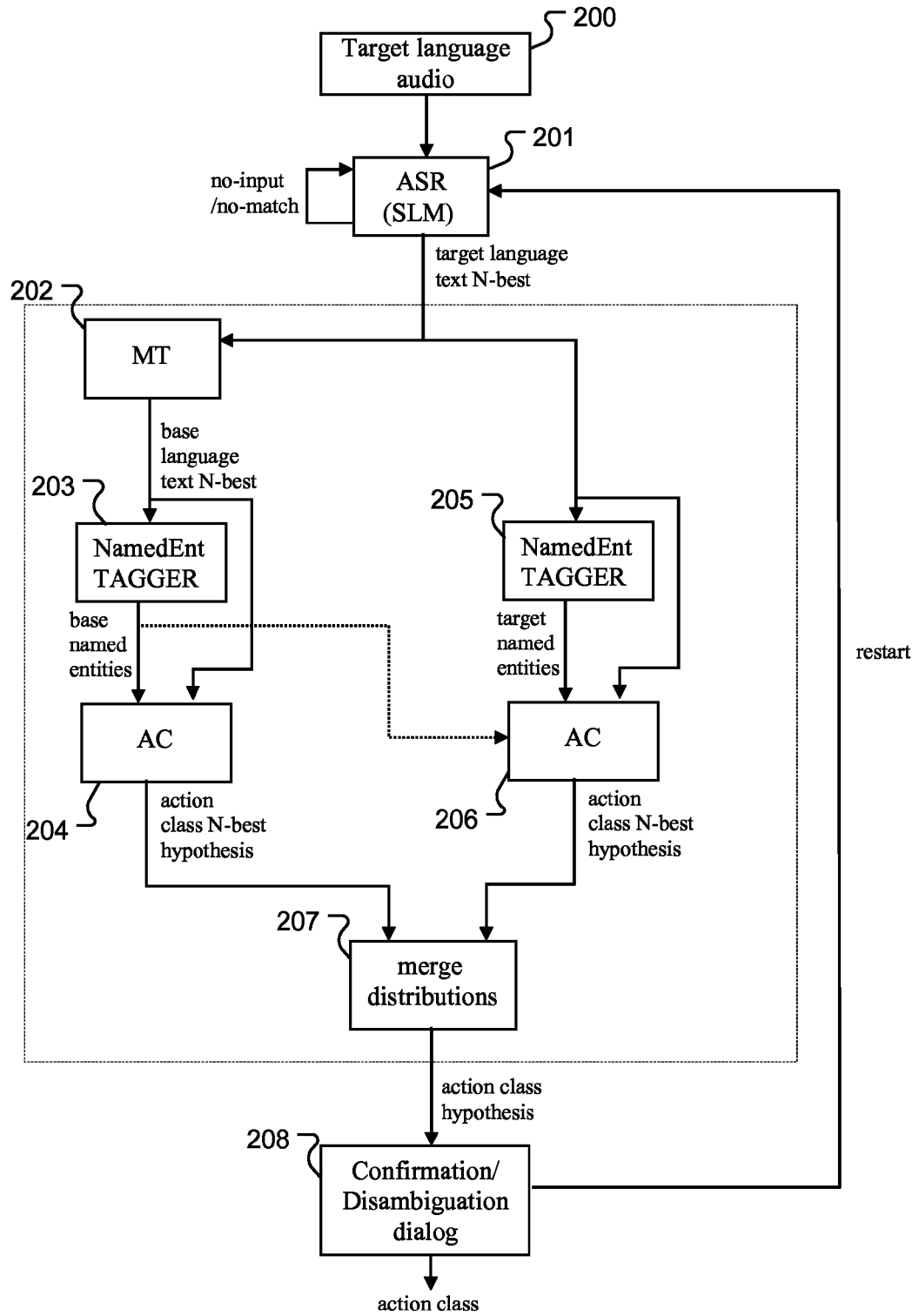
FIG. 2 shows a spoken dialog system architecture for an action class process for a target language input according to an embodiment of the present invention.

Looking more closely at the Customer/Machine/Agent Hybrid dialog, step 105, there are multiple different specific architectures that may be used for implementation of an arrangement for porting source language dialog components for use in a different target language. FIG. 2 shows an example of one specific architecture for an action classification process for a hybrid dialog process input in a given target language. The various blocks within the dashed lines may be implemented in many different specific functional variations. For example, the named entities in the dialog process may language independent where named entity class names such as STOCK-NAME & PRODUCT-NAME, their text content such as IBM, Google, & Lotus Notes, Outlook, and semantic interpretations are language independent, or not present at all. In some other cases, the named entities may be language dependent. One likely scenario that the class names and semantic interpretations are language independent, but the text content is language dependent.

The target language audio 200 initially is processed by automatic speech recognition (ASR) engine and its associated statistical language models (SLM) to produce an N-best list in the target language text, block 201. This can be using a machine translation (MT) approach that automatically translates the SLM training data to the target language preserving language independent named entities, if any, and from that the target language SLM is built. Alternatively, an MT and information-retrieval approach can be used to translate each sentence in the base language SLM training data to the target language, preserving the named entities, if any, and then for each translated SLM sentence a few sentences can be retrieved (using known information retrieval methods) from a generic target language SLM training corpus (named entities may be handled by replacing them with their contents). A generic target language SLM training corpus can be translated to the source language and retrieval carried out in the source language to benefit from improvements over single language retrieval. The target language SLM can be built based on both translated and retrieved sentences. Alternatively, a manual approach can be used to develop the ASR engine where the SLM training data is manually translated (preserving named entities) and from that the target language SLM is built. Named entities in the target language can then be tagged, block 205, using SLM training data in target language, and action class N-best hypotheses can be produced in the target language using a portion of the SLM training data or based on separate AC training data.

Looking at the left side of FIG. 2, it may be useful to modify the various source language models to best handle machine translated inputs from the target language into the source language. The target language N-best list text (from the ASR, block 201) can be machine translated to create a source language N-best list, block 202. The resulting source language N-best list text can then be tagged by a source language named entity tagger, block 203, and processed into source language action classes, block 204. At run time, the target language and source language N-best lists can be generated combined by a distribution merge process, block 207, and the combined action class hypotheses can be parsed by confirmation/disambiguation grammars for the dialog process, block 208.

The foregoing discussion treats the machine translation 202 as a black box, but in this context it may be particularly sensitive to word casing and punctuation of named entities. The named entities should be added to the dictionary of the machine translation 202 or some other means used to identify named entities which are not to be translated. Where NE class and interpretations may be language independent but the contents are language dependent, the contents should not be translated by machine translation 202 but rather external mapping or rules can be used to translate the contents. It also may be useful to use some mechanism to predict punctuations in the output of the ASR 201 to see if that improves the output of the machine translation 202.

In the case of language dependent named entities, the processes on the right side of FIG. 2 need to be ported to the target language. Specifically, the target language named entities may be ported by machine translation or manually, paying attention to pronunciations (both target language pronunciation and source language pronunciation with phone mapping) and to maintaining the source language contents. Target language ASR/SLM, named entity tagging models and action class models can be developed as previously discussed as is the left side (source language side) of FIG. 2. The action class data can also be translated manually or by machine translation to build the understanding or AC models in the target language. However, this method requires language expertise from the people who build such dialog applications. Rather than architecture such as the one in FIG. 2, some embodiments, may not necessarily need to build all the named entity models and action class models in the target language. Instead, it may be possible to build only ASR and TTS modules in the target language and use an MT interface to perform the understanding and dialog management in the source language.

An example dialog is as follows where English is the source language and Turkish is the target language. Thus, the user speaks Turkish, the non-native agent does not speak Turkish but speaks English (it can be altogether a different third language other than English and Turkish), and the native agent speaks Turkish.

U: User, M: Machine, NNA: Nonnative Agent, NA: Native Agent

M: Hello, how may I help you?

U: Hesabimi kapatmak istiyorum [English Translation: I want to close my account]

The dialog process automatically does language identification and determines that the user is speaking in Turkish. Then the system first runs the Turkish automatic speech recognizer to transcribe the user's utterance into representative text. The transcribed utterance is sent to a Turkish to English machine translation (MT) system to generate the corresponding English translation given above in italics. The speech understanding component maps the translated utterance to an ACCOUNT-CLOSE action with a call-router and brings the Non-native agent (NA) into the dialog:

NNA: I am sorry to hear that, I would bring on board a native speaking agent to discuss the reasons for closing the account and see whether we can change your mind [Turkish Translation: Hesabinizi kapatmak istediginiz icin uzgunum. Simdi, sizi sizinle ayni dili konusan bir arkadasimiza baglayip, neden hesabinizi kapatmak istediginizi ogrenmek istiyoruz]

[MT translates the NNA speech into Turkish]

NA: Merhaba sizinle calismaya devam etmek istiyoruz, Neden hesabinizi kpatmak istiyorsunuz [English Translation: Hi, We would like to keep working with you, Why do you want to close your account?]

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components. For example, a pseudo code representation of such an embodiment might be set forth as follows:

```
Process MT_Dialog
    receive user_query(target_language)
    translate user_query(target_language, source_language)
    reply (user, target_language)
    if dialog_process = initial_assistance_state,
        provide source_language_agent; and
    if dialog_process = further_assistance_state,
        provide target_language_agent
```

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of performing a real time human machine dialog process with a human user using a target language, the dialog process employing an automated dialog application stored in memory and implemented by at least one hardware implemented computer processor, the method comprising:
   receiving with the automated dialog application a user query in the target language, the dialog application implementing a dialog between a human and a machine;
   creating generic translation tables using large parallel corpora;
   performing automatic machine translation of the user query into a source language, the source language being a language of the automated dialog application, wherein performing the automatic machine translation utilizes the created generic translation tables and includes mapping the query from the target language to the source language;
   providing the dialog between the human and the machine by delivering an automated reply of the dialog application to the user in the target language through use of one or more statistical language models, the reply being a conversational response to the user query originated by the dialog application and selected from memory associated with the processor;
   if the dialog process reaches an initial assistance state, providing a hybrid dialog between the human and a non-native agent through the machine by transferring the user to a first human agent using the source language to interact in real time with the user in the target language by machine translation to continue the dialog process; and
   if the dialog process reaches a further assistance state, providing a dialog between the human and a native-agent by transferring the user, through the machine, to a second human agent using the target language to interact in real time with the user in the target language to continue the dialog process, the further assistance state reached when the initial assistance state with the first human agent is unsuccessful.

2. A method according to claim 1, wherein delivering an automated reply includes delivering an existing dialog application reply in the target language.

3. A method according to claim 1, wherein delivering an automated reply includes:
   selecting an existing dialog application reply in the source language;
   performing automatic machine translation of the selected reply to the target language; and
   delivering the translated reply to the user.

4. A method according to claim 1, wherein the dialog process is a text dialog process.

5. A method according to claim 1, wherein the dialog process is a speech dialog process.

6. A dialog process system to conduct a real time human machine dialog with a human user using a target language, the system employing at least one hardware implemented computer processor and an automated dialog application stored in memory and implemented by the computer processor, the system comprising:
   means for receiving with the automated dialog application a user query in the target language, the dialog application implementing a dialog between a human and a machine;
   means for creating generic translation tables using large parallel corpora;
   means for performing automatic machine translation of the user query into a source language, the source language being a language of the automated dialog application, wherein performing the automatic machine translation utilizes the created generic translation tables and includes mapping the query from the target language to the source language;
   means for delivering an automated reply of the dialog application to the user in the target language through use of one or more statistical language models, delivering an automated reply providing the dialog between the human and the machine and the reply being a conversational response to the user query originated by the dialog application and selected from memory associated with the processor;
   means for providing a hybrid dialog between the human and a non-native agent through the machine by transferring the user, if the dialog process reaches an initial assistance state, to a first human agent using the source language to interact in real time with the user in the target language by machine translation to continue the dialog process; and
   means for providing a dialog between the human and a native-agent by transferring the user, through the machine, if the dialog process reaches a further assistance state, to a second human agent using the target language to interact in real time with the user in the target language to continue the dialog process, the further assistance state reached when the initial assistance state with the first human agent is unsuccessful.

7. A system according to claim 6, wherein the means for delivering an automated reply includes means for delivering an existing dialog application reply in the target language.

8. A system according to claim 6, wherein the means for delivering an automated reply includes:
   means for selecting an existing dialog application reply in the source language;
   means for performing automatic machine translation of the selected reply to the target language; and
   means for delivering the translated reply to the user.

9. A system according to claim 6, wherein the dialog process is a text dialog process.

10. A system according to claim 6, wherein the dialog process is a speech dialog process.

11. A computer program product implemented in a non-transitory computer readable storage medium for performing a real time human machine dialog process with a human user using a target language, the dialog process employing an automated dialog application stored in memory and implemented by at least one hardware processor, the product comprising:
    program code for receiving with the automated dialog application a user query in the target language, the dialog application implementing a dialog between a human and a machine;
    program code for creating generic translation tables using large parallel corpora;
    program code for performing automatic machine translation of the user query into a source language, the source language being a language of the automated dialog application, wherein performing the automatic machine translation utilizes the created generic translation tables and includes mapping the query from the target language to the source language;
    program code for providing the dialog between the human and the machine by delivering an automated reply of the dialog application to the user in the target language through use of one or more statistical language models, the reply being a conversational response to the user query originated by the dialog application and selected from memory associated with the processor;
    program code for providing a hybrid dialog between the human and a non-native agent through the machine by transferring the user, if the dialog process reaches an initial assistance state, to a first human agent using the source language to interact in real time with the user in the target language by machine translation to continue the dialog process; and
    program code for providing a dialog between the human and a native-agent by transferring the user, through the machine, if the dialog process reaches a further assistance state, to a second human agent using the target language to interact in real time with the user in the target language to continue the dialog process, the further assistance state reached when the initial assistance state with the first human agent is unsuccessful.

12. A product according to claim 11, wherein the program code for delivering an automated reply includes program code for delivering an existing dialog application reply in the target language.

13. A product according to claim 11, wherein the program code for delivering an automated reply includes:
    program code for selecting an existing dialog application reply in the source language;
    program code for performing automatic machine translation of the selected reply to the target language; and
    program code for delivering the translated reply to the user.

14. A product according to claim 11, wherein the dialog process is a text dialog process.

15. A product according to claim 11, wherein the dialog process is a speech dialog process.

16. A customer service contact center operating an automated dialog application using a source language stored in memory and implemented by at least one hardware implemented computer processor to conduct a real time human machine dialog process with a human user using a target language, the contact center comprising:
    a single centralized location for handling customer service inputs from remote customers using an automated dialog process including:
        receiving with the automated dialog application a user query in the target language, the dialog application implementing a dialog between a human and a machine;
        creating generic translation tables using large parallel corpora;
        performing automatic machine translation of the user query into the source language, the source language being a language of the automated dialog application, wherein performing the automatic machine translation utilizes the created generic translation tables and includes mapping the query from the target language to the source language;
        providing the dialog between the human and the machine by delivering an automated reply of the dialog application to the user in the target language through use of one or more statistical language models, the reply being a conversational response to the user query originated by the dialog application and selected from memory associated with the processor;
        if the dialog process reaches an initial assistance state, providing a hybrid dialog between the human and a non-native agent through a machine by transferring the user to a first human agent using the source language to interact in real time with the user in the target language by machine translation to continue the dialog process; and
        if the dialog process reaches a further assistance state, providing a dialog between the human and a native-agent by transferring the user, through the machine, to a second human agent using the target language to interact in real time with the user in the target language to continue the dialog process, the further assistance state reached when the initial assistance state with the first human agent is unsuccessful.

17. A customer service contact center according to claim 16, wherein delivering an automated reply includes delivering an existing dialog application reply in the target language.

18. A customer service contact center according to claim 16, wherein delivering an automated reply includes:
    selecting an existing dialog application reply in the source language;
    performing automatic machine translation of the selected reply to the target language; and
    delivering the translated reply to the user.

19. A customer service contact center according to claim 16, wherein the dialog process is a text dialog process.

20. A customer service contact center according to claim 16, wherein the dialog process is a speech dialog process.

21. A customer service contact center according to claim 16, wherein the source language is selected based on satisfying an objective selection function.

* * * * *